United States Patent Office 3,152,143
Patented Oct. 6, 1964

3,152,143
AMINO ESTERS OF 2,3-BIS(p-METHOXYPHENYL)-SUBSTITUTED 1-PENTANOL AND PENTANOIC ACID
Kurt J. Rorig, Glenview, Ill., assignor to G. D. Searle & Co., Chicago, Ill., a corporation of Delaware
No Drawing. Filed Jan. 2, 1962, Ser. No. 163,876
9 Claims. (Cl. 260—326.3)

This invention relates to amino esters of 2,3-bis(p-alkoxyphenyl)-substituted 1-pentanol and pentanoic acid, intermediates thereto, and processes for the preparation thereof. More particularly, this invention relates to new and useful chemical compounds having the formula

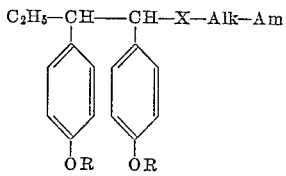

wherein X represents a carbonyloxymethylene radical, Alk represents an alkylene radical, Am represents an optionally-alkylated amino radical, and R represents an alkyl radical.

Those skilled in the art will recognize that when the carbonyloxymethylene radical represented by X

—CO—O—CH$_2$— is disposed such that the carbonyl constituent attaches to the alkylene radical represented by Alk the compounds contemplated are aminoalkanoic acid esters of 2,3-bis(p-alkoxyphenyl)-1-pentanols, whereas when the positioning of the carbonyloxymethylene radical represented by X is reversed and the methylene constituent attaches to Alk, the compounds contemplated are aminoalkanol esters of 2,3-bis(p-alkoxyphenyl)pentanoic acids.

Since there are at least two asymmetric carbon atoms unexceptionably present in the subject compositions, it follows that these compositions exist in a minimum of two racemic and four optically active forms.

Among the alkylene radicals represented by Alk in the first and generic formula hereinabove, especially lower alkylene radicals are preferred, for example, methylene, ethylene, trimethylene, propylene, tetramethylene, 2-methyl 1,2-propylene, pentamethylene, 2,2-dimethyl-1,3-propylene, and like bivalent, saturated, acyclic, straight- or branched-chain, hydrocarbon groupings having the formula —C$_n$H$_{2n}$— wherein $n$ represents a positive integer less than 8.

Am in the generic formula for compounds of this invention subsumes both the primary amino radical, —NH$_2$, and secondary and most advantageously tertiary amino radicals resulting from the substitution of 1 or 2 alkyl radicals, respectively, for hydrogen therein—especially lower alkyl radicals, such as methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain, hydrocarbon groupings having the formula —C$_n$H$_{2n+1}$ wherein $n$ represents, as before, a positive integer less than 8. The alkyl groupings present when Am designates a tertiary amino radical may either be discrete, thus

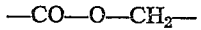

or they may be joined together directly or through oxygen or a second nitrogen atom to compose cyclic amino radicals optimally but not necessarily exclusively comprising at least 4 and as many as 6 carbon atoms as illustrated in the examples hereafter. Somewhat more broadly representative of the cyclic amino radicals contemplated by Am are pyrrolidino, methylpyrrolidino, dimethylpyrrolidino, trimethylpyrrolidino, piperidino, methylpiperidino, dimethylpiperidino, methylethylpiperidino, morpholino, piperazino, methylpiperazino, ethylpiperazino, and like monovalent, 5- and 6-membered heterocyclic groupings. The terminal "ino" in the radical names set forth denotes attachment of the radicals thus characterized via nitrogen.

The alkyl radicals represented by R in the generic formula above are, like those which compose the secondary and tertiary amino radicals represented by Am, preferably of lower order also.

Equivalent to the foregoing basic amino esters of this invention for the purposes here disclosed are non-toxic acid addition and quaternary ammonium salts thereof, the compositions of which may be symbolized by

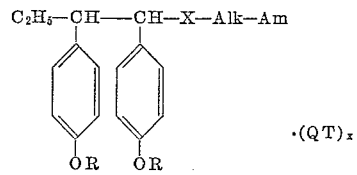

wherein X, Alk, Am, and R retain the meanings previously assigned; Q is selected from among hydrogen and lower alkyl, hydroxy(lower alkyl) and lower alkenyl radicals, as also such aralkyl radicals as benzyl, phenylethyl, and naphthylmethyl; T represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage; and $x$ represents a positive integer less than 3.

The compounds to which this invention relates are useful because of their valuable pharmacological properties. Thus, for example, they are anti-cholesterologenic agents adapted to inhibit exogenous hypercholesterolemia and the incorporation of mevalonic acid during biosynthesis of cholesterol; and, further, they are anti-biotics variously effective against bacteria such as B. subtilis and Diplococcus pneumoniae, fungi such as Trichophyton mentagrophytes, algae such as Chlorella vulgaris, and cotyledonous seed germination. Moreover, the compounds hereof are estrogenic; and they also act to reduce the heat, swelling, and rubor characteristic of the inflammatory response to tissue insult. The estrogenic and anti-inflammatory activitives of these products are wholly unexpected in view of the fact that the analogous 2-diethylaminoethyl 2,3-bis(p-methoxyphenyl)propionate produces no significant response in standardized screening assays for estrogenic and anti-inflammatory activities.

Preparation of the subject aminoalkanoic acid esters of 2,3-bis(p-alkoxyphenyl)-1-pentanols proceeds by heating a pentanol of the formula

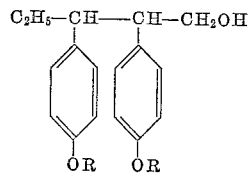

in an inert solvent, such as butanone, and using potassium carbonate or the equivalent as an acid acceptor, with an appropriate acid chloride

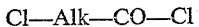

to produce a corresponding chloro ester

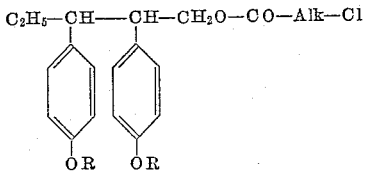

which in turn is heated in an inert solvent, such as butanone, using sodium iodide or the equivalent as a catalyst, with an amine of the formula Am—H to give a corresponding 2,3-bis(p-alkoxyphenyl)-1-pentanol aminoalkanoic acid ester hereof. The latter reaction is carried out in a sealed vessel to the extent necessary to prevent loss by volatilization of the intermediate amine, in process.

Preparation of the subject aminoalkanol esters of 2,3-bis(p-alkoxyphenyl)pentanoic acids, on the other hand, proceeds by heating an acid of the formula

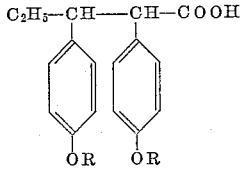

in an inert solvent, such as 2-propanol, with an appropriate aminoalkyl chloride Cl—Alk—Am Alternatively, the acid is converted to the corresponding acid chloride

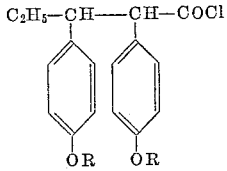

by heating with thionyl chloride in an inert anhydrous solvent, such as ether, using pyridine or the equivalent as catalyst; and the acid chloride in turn is heated in an inert solvent, such as benzene or butanone, using potassium carbonate or the equivalent as an acid acceptor, with an appropriate aminoalkanol Am—Alk—OH to give the corresponding 2,3-bis(p-alkoxyphenyl)pentanoic acid aminoalkanol esters hereof.

Throughout the foregoing diagrammatic representation of means whereby the compounds hereof can be prepared, Alk, Am, and R retain the meanings previously assigned.

Conversion of the basic esters of this invention to corresponding acid addition salts is accomplished by simple admixture thereof with 1 or 2 equivalents of any of various inorganic and strong organic acids, the anionic portion of which conforms to T as hereinbefore defined.

The quaternary compounds comprehended are those derived by contacting a claimed basic ester with an organic ester of the formula

QT

Q and T being limited by the meanings hereinabove assigned. Either 1 or 2 Q—T aggregates may be incorporated, quaternization taking place in the temperature range between 25 and 100 degrees centigrade in an inert solvent such as chloroform, acetone, butanone, methanol, butanol, or the like. The reaction is ordinarily completed in from 1 to 48 hours and is generally carried out in a closed system if a lower alkyl halide—such as methyl chloride—is one of the reagents. Using methyl bromide, the preparation of quaternary salts may be smoothly effected in butanone solution at 70 degrees centigrade after a reaction period of approximately 1 hour.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted. Specific rotations are referred to the D line of sodium.

*Example 1*

A. *2,3-bis(p-methoxyphenyl)-1-pentanol.*—To a solution of 76 parts of lithium aluminum hydride in 7080 parts of anhydrous ether at the boiling point under reflux is added, during ¾ hour and with continuous agitation, a solution of 472 parts of 2,3-bis(p-methoxyphenyl)pentanoic acid melting at approximately 139–140° [preparable by methylation of 2,3-bis-(p-hydroxyphenyl)pentanoic acid melting at approximately 189–190° as disclosed in Example 1 of U.S. 2,745,870] in 5000 parts of dioxane. The resultant mixture is maintained with agitation at the boiling point under reflux for 4 hours, then decomposed by the serial addition of 78 parts of water, 72 parts of aqueous 20% sodium hydroxide, and 274 parts of water. The granular inorganic precipitate thrown down is removed by filtration, and the filtrate is stripped of solvent by vacuum distillation. The residue, a viscous colorless oil which boils at 190–195° under 0.5 mm. pressure, is the desired 2,3-bis(p-methoxyphenyl)-1-pentanol. The product is a racemate composed of two enantiomorphs individually diastereomeric with the enantiomorphs which compose the product of Example 5 below.

B. *2,3-bis(p-methoxyphenyl)pentyl chloroacetate.*—A mixture of 15 parts of 2,3-bis(p-methoxyphenyl)-1-pentanol boiling at 190–195°/0.5 mm., 7 parts of chloroacetyl chloride, 10 parts of finely-divided potassium carbonate, and 165 parts of butanone is heated at the boiling point under reflux with agitation for 4 hours. The inorganic salts precipitated in process are removed by filtration, and the filtrate is freed of solvent by vacuum distillation. The residue, a viscous oil, is the desired 2,3-bis(p-methoxyphenyl)pentyl chloroacetate.

C. *2,3-bis(p-methoxyphenyl)pentyl dimethylaminoacetate.*—Approximately 110 parts of dimethylamine is introduced beneath the surface of an ice cold solution of 90 parts of the 2,3-bis(p-methoxyphenyl)pentyl chloroacetate prepared as described in the foregoing Part B of this example in 560 parts of butanone. Approximately 1 part of sodium iodide is thereupon introduced, and the resultant mixture is heated at around 60° in a sealed vessel for 18 hours. Butanone is then removed by distillation, and the residual oil is made basic with dilute aqueous sodium hydroxide. The resultant mixture is extracted with ether. The ether extract, in turn, is extracted with dilute hydrochloric acid; and the acid extract is basified with sodium hydroxide. The mixture thus obtained is extracted with ether; and the ether extract is washed with water, dried over anhydrous potassium carbonate, and freed of solvent by distillation. The residue, an oil, is the desired 2,3- bis(p-methoxyphenyl)pentyl dimethylaminoacetate. The product has the formula

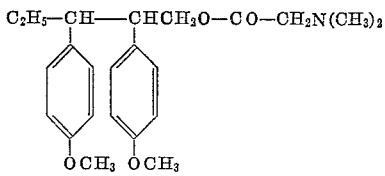

*Example 2*

*2,3-bis(p-methoxyphenyl)pentyl diethylaminoacetate.*—Substitution of 50 parts of diethylamine for the dimethylamine called for in Part C of Example 1 affords, by the procedure there detailed, 2,3-bis(p-methoxyphenyl)pentyl diethylaminoacetate as a pale yellow oil. The product has the formula

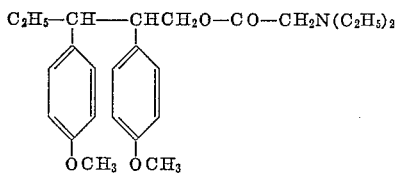

*Example 3*

A. *2,3-bis(p-methoxyphenyl)pentyl 3-chloropropionate.*—Substitution of 10 parts of 3-chloropropionyl chloride for the chloroacetyl chloride called for in Part B of Example 1 affords, by the procedure there detailed, 2,3-bis(p-methoxyphenyl)pentyl 3-chloropropionate as a viscous oil.

B. *2,3-bis(p-methoxyphenyl)pentyl 3-dimethylaminopropionate.*—Substitution of 90 parts of 2,3-bis(p-methoxyphenyl)pentyl 3-chloropropionate prepared as described in Part A of this example for the 2,3-bis(p-methoxyphenyl)pentyl chloroacetate called for in Part C of Example 1 affords, by the procedure there detailed, 2,3-bis(p-methoxyphenyl)pentyl 3-dimethylaminopropionate as a viscous oil. The product has the formula

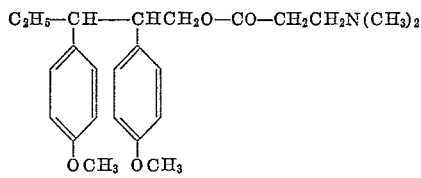

*Example 4*

*2,3-bis(p-methoxyphenyl)pentyl 3-diethylaminopropionate.*—Substitution of 50 parts of diethylamine and 90 parts of 2,3-bis(p-methoxyphenyl)pentyl 3-chloropropionate prepared as describe din Example 3A for the dimethylamine and 2,3-bis(p-methoxyphenyl)pentyl chloroacetate, respectively, called for in Example C affords, by the procedure there detailed, 2,3-bis(p-methoxyphenyl)pentyl 3-diethylaminopropionate as a viscous oil. The product has the formula

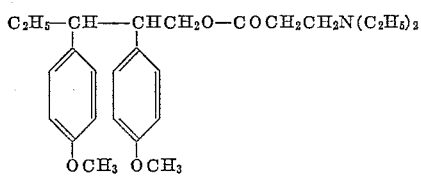

*Example 5*

*2,3-bis(p-methoxyphenyl)-1-pentanol.*—Substitution of 472 parts of 2,3-bis(p-methoxyphenyl)pentanoic acid melting at approximately 183–184° [U.S. 2,745,870] for the 2,3-bis(p-methoxyphenyl)pentanoic acid melting at about 139–140° called for in Example 1A affords, by the procedure there detailed, 2,3-bis(p-methoxyphenyl)-1-pentanol as a colorless solid which, upon recrystallization from a mixture of methanol and water, melts at 124.5–126.5°. The product is a raceme composed of two enantiomorphs diastereomeric with the enantiomorphs which compose the product of Example 1A above and can be substituted therefor in the procedures of Examples 1–4 to provide corresponding racemes of the products described the foregoing examples.

*Example 6*

A. *2,3-bis(p-methoxyphenyl)pentanoyl chloride.*—A mixture of 31 parts of 2,3-bis(p-methoxyphenyl)-pentanoic acid melting at approximately 183–184°, 600 parts of anhydrous ether, 25 parts of thionyl chloride, and approximately 1 part of pyridine is heated at the boiling point under reflux with agitation for 2 hours, then freed of ether and excess thionyl chloride by vacuum distillation. The colorless crystalline residue is 2,3-bis(p-methoxyphenyl)pentanoyl chloride melting at approximately 130–131°. The product is a raceme composed of two enantiomorphs individually diastereomeric with the enantiomorphs which compose the product of Example 7A below.

B. *2-dimethylaminoethyl 2,3-bis(p-methoxyphenyl) pentanoate.*—A mixture of 10 parts of 2,3-bis(p-methoxyphenyl)pentanoyl chloride melting at approximately 130–131°, 3 parts of 2-dimethylamino-1-ethanol, 4 parts of finely-divided anhydrous potassium carbonate, and 40 parts of butanone is heated at the boiling point under reflux with agitation for 6 hours, then freed of solvent by vacuum distillation. The residue is partitioned between water and benzene. The benzene phase is separated, dried over anhydrous potassium carbonate, and freed of solvent by distillation. The residue, an ivory-colored waxen solid, is recrystallized from cyclohexane to give 2-dimethylaminoethyl 2,3-bis(p-methoxyphenyl)pentanoate as a white powder melting at 97–99°. The product is a raceme composed of two enantiomorphs individually diastereomeric with the enantiomorphs which compose the product of Example 7B below. The product has the formula

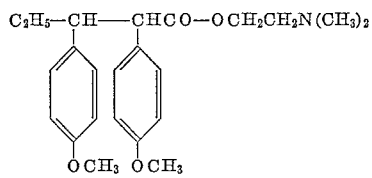

C. *2 - dimethylaminoethyl 2,3 - bis(p-methoxyphenyl) pentanoate hydrochloride.*—To a solution of 10 parts of the 2-dimethylaminoethyl 2,3-bis(p-methoxyphenyl)pentanoate of the foregoing Part B of this example in 150 parts of anhydrous ether is added just sufficient hydrogen chloride to induce acidity. Precipitation of 2-dimethylaminoethyl 2,3-bis(p-methoxy-phenyl)pentanoate hydrochloride occurs. The product, filtered off and recrystallized from a mixture of absolute ethanol and anhydrous ether, is obtained as slim colorless needles melting at 197–199°. This product is a raceme composed of two enantiomorphs individually diastereomeric with the enantiomorphs which compose the product of Example 7C below.

*Example 7*

A. *2,3 - bis(p - methoxyphenyl)pentanoyl chloride.*—Substitution of 31 parts of 2,3-bis(p-methoxyphenyl)-pentanoic acid melting at approximately 139–140° for the 2,3-bis(p-methoxyphenyl)pentanoic acid melting at approximately 183–184° called for in Part A of Example 6 affords, by the procedure there detailed, 2,3-bis(p-methoxyphenyl)pentanoyl chloride as an oil. The product is a raceme composed of two enantiomorphs individually diastereomeric with the enantiomorphs which compose the product of Example 6A above.

B. *2 - dimethylaminoethyl 2,3 - bis(p-methoxyphenyl) pentanoate.*—Substitution of 10 parts of the 2,3-bis(p-methoxyphenyl)pentanoyl chloride of the foregoing Part A of this example for the 2,3-bis(p-methoxyphenyl)pentanoyl chloride called for in Example 6B affords, by the procedure there detailed, 2-di-methylaminoethyl 2,3-bis(p-methoxyphenyl)pentanoate as an oil. The product is a raceme composed of two enantiomorphs individually diastereomeric with the enantiomorphs which compose the product of Example 6B above.

C. *2 - dimethylaminoethyl 2,3 - bis(p-methoxyphenyl) pentanoate hydrochloride.*—Substitution of 10 parts of the 2-dimethylaminoethyl 2,3-bis(p-methoxyphenyl)pentanoate of the foregoing Part B of this example for the 2-dimethylaminoethyl 2,3-bis(p-methoxyphenyl)-pentanoate called for in Part C of Example 6 affords, by the procedure there detailed, 2-dimethylaminoethyl 2,3-bis(p-methoxyphenyl)pentanoate hydrochloride melting at approximately 80°. The hygroscopic product is a raceme composed of two enantiomorphs individually diastereomeric with the enantiomorphs which compose the product of Example 6C above.

Example 8

A. *2-diethylaminoethyl 2,3-bis(p-methoxyphenyl)pentanoate hydrochloride.*—A mixture of 83 parts of 2,3-bis(p-methoxyphenyl)pentanoic acid melting at approximately 183–184°, 39 parts of 2-diethylaminoethyl chloride, and 315 parts of 2-propanol is heated at the boiling point under reflux for approximately 12 hours, then freed of solvent by vacuum distillation. The white powdery residue, recrystallized from a mixture of chloroform and ether, affords 2-diethylaminoethyl 2,3-bis(p-methoxyphenyl)pentanoate hydrochloride melting at 138–142°. It has the formula

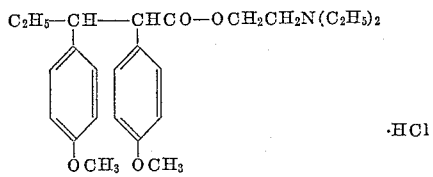

B. *2-diethylaminoethyl 2,3-bis(p-methoxyphenyl)pentanoate.*—The product of the foregoing Part A of this example is partitioned between aqueous 2% sodium hydroxide and ether, and the ethereal phase is dried over anhydrous potassium carbonate and freed of solvent by distillation. The white crystalline residue is 2-diethylaminoethyl 2,3-bis(p-methoxyphenyl)pentanoate melting at 76–79°. This product is a raceme composed of two enantiomorphs individually, diastereomeric with the enantiomorphs which compose the product of Example 10 below.

Example 9

A. *Dextro-2,3-bis(p-methoxyphenyl)pentanoic acid.*—A mixture of 36 parts of 2,3-bis(p-methoxyphenyl)pentanoic acid melting at approximately 183–184°, 19 parts of quinine, and 640 parts of absolute ethanol is heated to boiling and filtered. From the filtrate, on standing in the cold, is deposited the quinine salt of dextrorotatory 2,3-bis(p-methoxyphenyl)pentanoic acid which, filtered off and recrystallized from ethanol, melts at approximately 210–210.5° and is further characterized by a specific rotation of −70.5° at a temperature of 25° and a concentration of 1% in chloroform solution.

The dextrorotatory salt thus isolated is decomposed by the addition of cold dilute hydrochloric acid. The resultant mixture is extracted with ether; and the ether extract is washed thoroughly with water, dried over anhydrous sodium sulfate, and stripped of solvent by distillation. The residue, recrystallized from a mixture of ethanol and water, affords dextro-2,3-bis(p-methoxyphenyl)pentanoic acid as a colorless powder melting at 170–174° and further characterized by a specific rotation of +18.5° at a temperature of 25° and a concentration of 10% in dioxane solution.

B. *Dextro - 2 - diethylaminoethyl 2,3 - bis(p-methoxyphenyl)pentanoate hydrochloride.*—Substitution of 83 parts of dextro-2,3-bis(p-methoxyphenyl)pentanoic acid melting at 170–174° for the 2,3-bis(p-methoxyphenyl)pentanoic acid called for in Example 8A, and reduction of the heating time therein from 12 to 3 hours, affords, by a procedure otherwise identical with that detailed in Example 8A, dextro-2-diethylaminoethyl 2,3-bis(p-methoxyphenyl)pentanoate hydrochloride melting at approximately 164–165° and further characterized by specific rotation of +4.7° at a temperature of 25° and a concentration of 10% in ethanol solution. The product is one of the two enantiomorphs which compose the product of Example 8A.

Example 10

*2-Diethylaminoethyl 2,3-bis(p-methoxyphenyl)-pentanoate.*—To a solution of 35 parts of 2-diethylamino-1-ethanol in 1110 parts of benzene at the boiling point under reflux is added, during ½ hour, a solution of 80 parts of the 2,3-bis(p-methoxyphenyl)pentanoyl chloride prepared as described in Example 7A in 1110 parts of benzene. The resultant mixture is heated at the boiling point with agitation under reflux for 8 hours, then extracted with 2500 parts of 2% hydrochloric acid. The acid extract is basified with concentrated aqueous sodium hydroxide. The mixture thus obtained is extracted with ether; and the ether extract is washed with water, dried over anhydrous calcium sulfate, and stripped of solvent by distillation. The residual pale yellow oil is 2-diethylaminoethyl 2,3-bis(p-methoxyphenyl)pentanoate, a raceme composed of two enantiomorphs individually diastereomeric with the enantiomorphs which compose the product of Example 8B above.

Example 11

*3-dimethylaminopropyl 2,3-bis(p-methoxyphenyl)pentanoate hydrochloride.*—To a solution of 34 parts of 3-dimethylamino-1-propanol in 1300 parts of benzene at the boiling point under reflux is added, with agitation during ½ hour, a solution of 110 parts of 2,3-bis(p-methoxyphenyl)pentanoyl chloride melting at approximately 130–131° in 1760 parts of benzene. The resultant mixture is maintained with agitation at the boiling point under reflux for 8 hours, then cooled and diluted with 2000 parts of anhydrous ether. The precipitate which forms is filtered off and recrystallized from a mixture of ethanol and ether to give colorless crystals of 3-dimethylaminopropyl 2,3-bis(p-methoxyphenyl)pentanoate hydrochloride melting at 159–161°. This product is raceme composed of two enantiomorphs individually diastereomeric with the hydrochloric acid salts of the enantiomorphs which compose the product of Example 12 below. The formula of 3-dimethylaminopropyl 2,3-bis(p-methoxyphenyl)pentanoate hydrochloride is

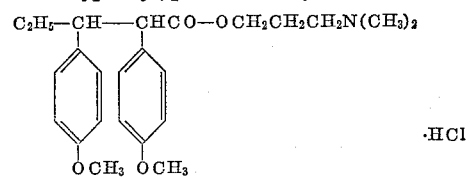

Example 12

*3-dimethylaminopropyl 2,3-bis(p-methoxyphenyl)pentanoate.*—A mixture of 83 parts of 2,3-bis(p-methoxyphenyl)pentanoic acid melting at approximately 139–140°, 45 parts of 3-dimethylaminopropyl chloride, and 315 parts of 2-propanol is heated at the boiling point under reflux for 12 hours, then freed of solvent by vacuum distillation. The residue is partitioned between excess aqueous 2% sodium hydroxide and ether. The ether phase is separated, dried over anhydrous potassium carbonate, and freed of solvent by distillation. The residue, an oil, is the desired 3-dimethylaminopropyl 2,3-bis(p-methoxyphenyl)pentanoate. This product is a raceme composed of two enantiomorphs individually diastereomeric with the bases corresponding to the enantiomorphic salts which compose the product of Example 11 above.

Example 13

*3-diethylaminopropyl 2,3-bis(p-methoxyphenyl)pentanoate hydrochloride.*—Substitution of 44 parts of 3-diethylamino-1-propanol for the 3-dimethylamino-1-propanol called for in Example 11 affords, by the procedure there detailed, 3-di-ethylaminopropyl 2,3-bis(p-methoxyphenyl)pentanoate hydrochloride as a colorless crystalline product melting at 170–172°. The product has the formula

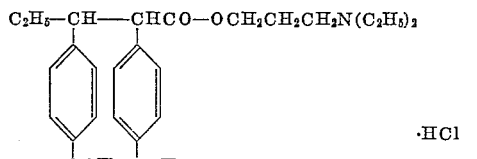

Example 14

*2-pyrrolidinoethyl 2,3-bis(p-methoxyphenyl)pentanoate hydrochloride.*—Substitution of 38 parts of 2-pyrrolidinoethanol for the 3-dimethylamino-1-propanol called for in Example 11 affords, by the procedure there detailed, 2-pyrrolidinoethyl 2,3-bis(p-methoxyphenyl)pentanoate hydrochloride as ivory massive blades melting at 161–164°. The product has the formula

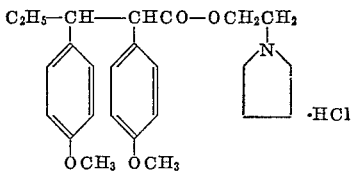

Example 15

*2 - (2,5 - dimethylpyrrolidino)ethyl 2,3-bis(p-methoxyphenyl)pentanoate.*—Substitution of 45 parts of 2-(2,5-dimethylpyrrolidino)-1-ethanol and 100 parts of 2,3-bis(p-methoxyphenyl)pentanoyl chloride melting at approximately 130–131° for the 2-diethylamino-1-ethanol and 2,3-bis(p-methoxyphenyl)pentanoyl chloride, respectively, called for in Example 10 affords, by the procedure there detailed, 2-(2,5-dimethylpyrrolidino)ethyl 2,3-bis(p-methoxyphenyl)pentanoate which, when recrystallized from hexane, is obtained as an ecru solid melting at approximately 74–75°. The product has the formula

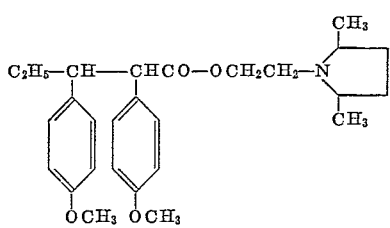

Example 16

*2,2-dimethyl-3-piperidinopropyl 2,3-bis(p-methoxyphenyl)pentanoate hydrochloride.*—Substitution of 57 parts of 2,2-dimethyl-3-piperidino-1-propanol for the 3-dimethylamino-1-propanol called for in Example 11 affords, by the procedure there detailed, 2,2-dimethyl-3-piperidinopropyl 2,3-bis(p-methoxyphenyl)pentanoate hydrochloride melting at 158–161°. The product has the formula

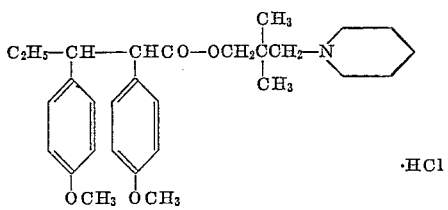

Example 17

*3 - morpholinopropyl 2,3-bis(p-methoxyphenyl)pentanoate hydrochloride.*—Substitution of 48 parts of 3-morpholino-1-propanol for the 3-dimethylamino-1-propanol called for in Example 11 affords, by the procedure there detailed, 3-morpholinopropyl 2,3-bis(p-methoxyphenyl)pentanoate hydrochloride melting at 160–163°. The product has the formula

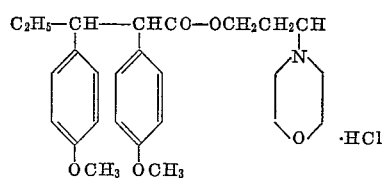

What is claimed is:
1. A compound of the formula

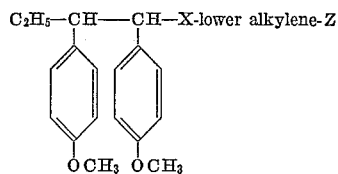

wherein X represents a radical of the formula

and Z represents a member of the class consisting of
(a) radicals of the formula

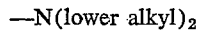

(b) a radical of the formula

(c) a radical of the formula

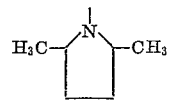

(d) a radical of the formula

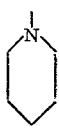

and
(e) a radical of the formula

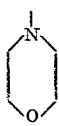

2. A compound of the formula

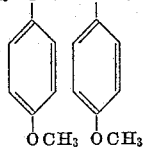

3. 2,3-bis(p-methoxyphenyl)pentyl 3-diethylaminopropionate.

4. A compound of the formula

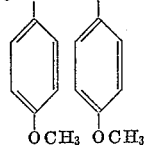

5. 2 - dimethylaminoethyl 2,3-bis(p-methoxyphenyl)pentanoate.

6. 2-diethylaminoethyl 2,3-bis(p-methoxyphenyl)pentanoate.

7. 3 - diethylaminopropyl 2,3-bis(p-methoxyphenyl)pentanoate.

8. A compound of the formula

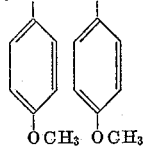

wherein $x$ represents a positive integer less than 3.

9. 2-pyrrolidinoethyl 2,3-bis(p-methoxyphenyl)pentanoate.

References Cited in the file of this patent
UNITED STATES PATENTS

| | | |
|---|---|---|
| 2,509,127 | Breivogel | May 23, 1950 |
| 3,060,192 | Bernstein et al. | Oct. 23, 1962 |
| 3,060,194 | Song et al. | Oct. 23, 1962 |
| 3,065,276 | Guest et al. | Nov. 20, 1962 |

OTHER REFERENCES

Wawzonek: J. Am. Chem. Soc., vol. 73, pages 5746–8 (1951), QD 1 A5.